Figure 1:
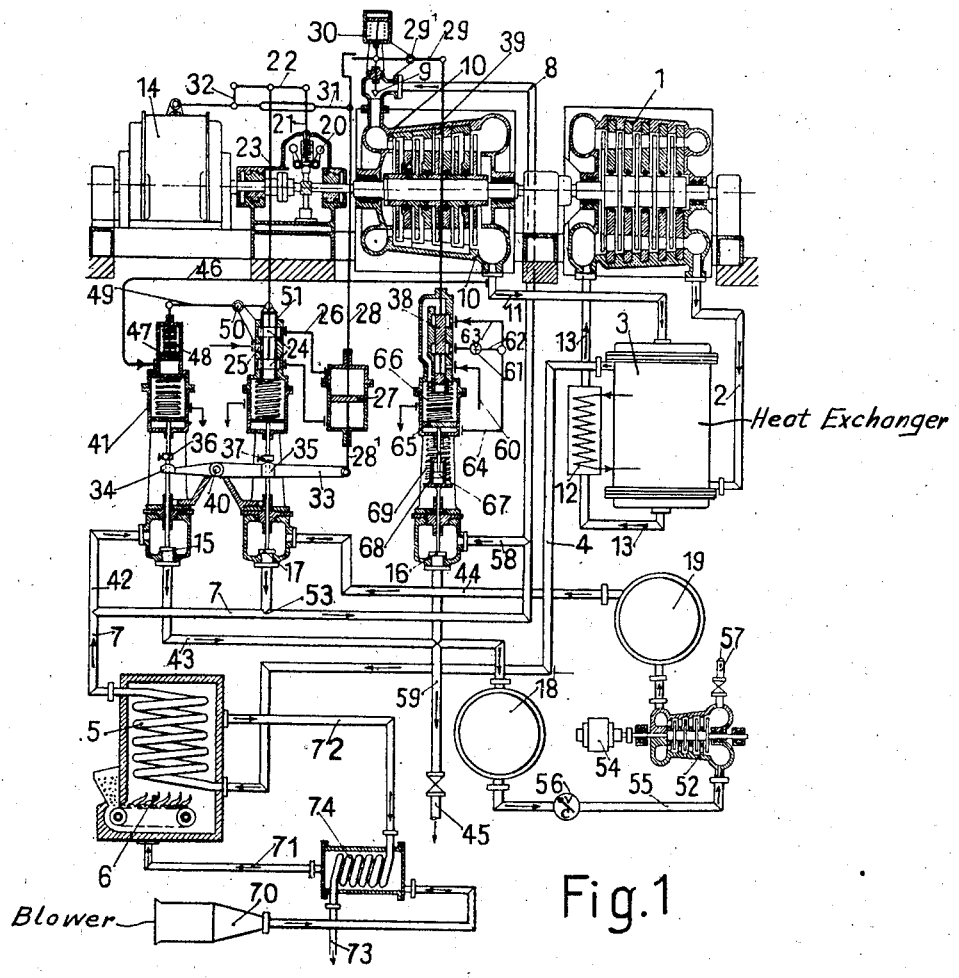

Dec. 7, 1943.  C. KELLER  2,336,178

THERMAL POWER PLANT

Filed May 2, 1942

Inventor
Curt Keller
By
Attorneys

Patented Dec. 7, 1943

2,336,178

UNITED STATES PATENT OFFICE 2,336,178

THERMAL POWER PLANT

Curt Keller, Zurich, Switzerland, assignor to Aktiengesellschaft Fuer Technische Studien, Zurich, Switzerland, a corporation of Switzerland Application May 2, 1942, Serial No. 441,551
In Switzerland May 8, 1941

7 Claims. (Cl. 60—59)

The invention relates to a method for regulating the output of thermal power plants, in which a gaseous working medium, preferably air, describes a cycle at a pressure above atmospheric, and which comprises means for temporarily varying the weight of the working medium circulating in the cycle and also a member for throttling the flow within the cycle. The invention further relates to an arrangement for carrying out this method.

Plants of the kind referred to comprise as most important parts a compressor for bringing the expanded gaseous working medium from a lower pressure to a higher pressure, a heater, in which the temperature of the compressed working medium is increased by a supply of heat from an external source, a turbine, in which the heated working medium of higher pressure expands to a lower pressure, and a cooler arranged before the compressor, as well as means for regulating the output. Hereby the heat of the expanded working medium issuing from the turbine may be recovered as far as possible in a heat exchanger wherein a part of said heat is transmitted to the working medium of higher pressure issuing from the compressor.

Owing to the fact that in such plants a change in output is brought about by varying the weight of the working medium describing the closed circuit, this being equivalent to a change in the absolute pressure within the cycle, it is possible to ensure, if the temperature of the working medium passing into the turbine is maintained constant by suitably controlling the supply of heat to the heater and if furthermore the current describing the circuit is not throttled, that the absolute pressures are varied, whilst the speeds of the turbine and compressor are kept constant, in the same ratio at the different points of the cycle, so that turbine and compressor operate with the same pressure ratio at all loads and therefore also with constant internal efficiency. Since, however, such a method for regulating the output involves for every change in load the supply of a certain quantity of working medium to the cycle from an external source, or alternatively a withdrawal of a certain quantity from the latter, and since these steps always require a certain period of time for their realization it may be found that, if changes in load occur suddenly and in quick succession, the regulating means may in certain circumstances not operate with sufficient rapidity. It has therefore already been proposed to provide auxiliary means for throttling the flow of working medium apart from the means for varying the density of the working medium describing the cycle.

The object of the present invention is to provide a method for regulating the output in thermal power plants of the kind mentioned, and also an arrangement for carrying out this method according to which the throttling step and the steps for varying the density of the working medium within the cycle are combined in such a manner that on the one hand, when a drop in load occurs within a given range, a sufficiently quick action on the part of the means regulating the output is ensured, and, on the other hand, the supply and withdrawal of working medium to and from the cycle respectively, are reduced to a minimum. As a result of the latter the unavoidable loss of energy involved with every supply of working medium to and withdrawal of such from the cycle are also reduced to a minimum. This advantage is of particular importance when changes in load occur frequently at short intervals. The invention therefore permits of rapidly adapting the plant to changes in load with a minimum of regulating losses. For this purpose, according to the novel method, changes in load which vary within the range of loads defined by the load corresponding to the momentary quantity of working medium circulating in the cycle without throttling and a load lying a certain fraction below the last mentioned load, are compensated by a corresponding throttling of the current describing the circuit, the quantity of working medium within the cycle not being varied, whilst changes in load of greater magnitude, lying beyond said mentioned range of loads, are compensated by a temporary supply of working medium to and a withdrawal of such medium from the cycle respectively. Thus, minor fluctuations in load of short duration, which may change rapidly, are compensated by throttling the circulating working medium to a greater or less extent, whilst fluctuations of greater magnitude and longer duration are compensated by varying the density of the working medium, i. e., the weight of the medium describing the cycle. In an arrangement according to the present invention for regulating the output of thermal power plants in the manner just described, the speed governor acts on the means controlling the supply of working medium to the cycle only after the throttling member has been nearly fully opened, whilst it acts on the means controlling the withdrawal of working medium from the circuit only when the throttling member has been brought into a position corresponding to a load which is a fraction smaller than the load corresponding to an unthrottled circuit.

In the accompanying drawing is shown, by way of example, plants with two forms of arrangements for carrying out the new method.

Figure 2:
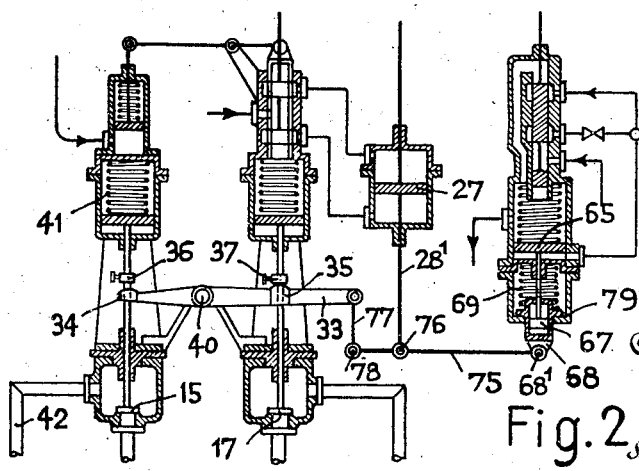

Fig. 1 shows in a simplified manner of representation a first embodiment of such an arrangement, whilst Fig. 2 shows a modification of details.

In the plant illustrated in Fig. 1 the working medium describing a closed cycle on leaving a centrifugal compressor 1, in which it has been brought to a higher pressure, passes into a pipe 2 and then into a heat exchanger 3 where it takes up heat. This working medium then passes through a pipe 4 into the coil 5 of a heater 6 in which its temperature is raised by a supply of heat from an external source. The working medium heated in this manner flows through pipes 7, 8 and past a throttling member 9 into a turbine 10 in which it expands to a lower pressure. The expanded working medium issuing from the turbine 10 passes through a pipe 11 again into the heat exchanger 3 wherein it gives up part of its heat to the working medium of higher pressure issuing from the compressor 1, whilst on leaving the heat exchanger 3 its remaining heat is given up in a cooler 12 fitted in the suction pipe 13 of the compressor 1. The working medium then passes through pipe 13 back into the compressor 1, thus completing its cycle. The output of turbine 10 which is not required by the compressor 1 is given up to the generator 14, hereinafter referred to as "energy consumer."

15 denotes a valve through which working medium can, on load being thrown off the plant, be discharged from the cycle described by the working medium through pipes 42 and 43 either into a low pressure reservoir 18 or through pipe 45 to the atmosphere. With the discharge valve 15 a second discharge valve 16 is arranged in parallel, through which working medium can, on this valve 16 being opened, be withdrawn from the cycle. Such withdrawn working medium passes from the pipe 8 through the pipes 58 and 43, 59 to the low pressure reservoir 18, or through pipe 45 to the atmosphere. A further valve 17 controls the supply of working medium to the point 53 of the normal cycle described by the working medium from a high pressure reservoir 19 which is connected by a pipe 44 to said valve 17. An auxiliary compressor 52 driven by a motor 54 serves for charging the reservoir 19; this compressor 52 draws working medium through a pipe 55, provided with a non-return valve 56, from a low pressure reservoir 18 or through a pipe 57 from the atmosphere, should the working medium be air.

The turbine 10 is provided with a centrifugal governor 20 acting on a rod 21 which is linked to a lever 22. To the latter a rod 23 rigidly connected to a control valve 24 is also linked. This valve 24 controls the supply of a medium under pressure from a channel 25 through a pipe 26 to the upper side of the piston 27 of a servomotor, the piston 27 acting by means of a rod 28 on a lever 29 pivoted on a journal $29^1$. The above mentioned throttling member 9 is also linked to this lever 29. A spring 30 endeavours to urge the throttling member 9 into the open position. By means of a lever 31 and a rod 32 connecting the lever 31 to lever 22 the required restoring movement of the control valve 24 is ensured by the movements of the auxiliary piston 27. This piston 27 is also connected by means of a rod $28^1$ to a lever 33 pivoted on a journal 40 and acting in conjunction with cams 34 and 35. The cam 34 co-operates with an adjustable stop 36 on the spindle of the discharge valve 15, whilst the cam 35 co-operates with an adjustable stop 37 on the spindle of the inlet valve 17. 38 denotes the control valve of a retarding device which is described in detail further down. This control valve 38 is connected by a rod 39 to lever 29 pivoted on journal $29^1$.

To the pipe 11 which forms a section of the cycle normally described by the working medium, a pipe 46 is connected which leads to the chamber below a piston 47. A spring 48 endeavours to maintain the balance against the pressure prevailing below piston 47. The latter is linked to a lever 49 which turns around a journal 50. On the piston 47 moving upwards, the lever 49 urges the sleeve 51 enclosing the control valve 24 in the downward direction.

The above mentioned valve 38 controls the flow of a liquid under pressure supplied through pipe 60 to a pipe 62 provided with an adjustable throttling member 61, as also the discharge of this liquid under pressure through a pipe 63. The liquid under pressure flowing into pipe 62 passes from the latter through pipe 63 into the space below a piston 65 which can be urged upwards against the pressure exerted by a spring 66. By suitably adjusting the throttling member 61 the movement of piston 65 can be retarded at will, so that the time interval within which a member 67 connected to this piston 65 reaches the upper end of a sleeve 68 is adjustable. When the member 67 hits against sleeve 68 the discharge valve 16 is raised against the pressure of a spring 69.

For the sake of completeness it is to be remarked that heat produced in the heater 6 and therefore also the heat supplied from an external source to the working medium describing the closed cycle can be regulated with the aid of a blower 70, in that the latter determines the volume of fresh air supplied to the grate of the heater 6 through a pipe 71. The exhaust gases issuing from heater 6 through a pipe 72 pass at first through a heat exchanger 74, wherein they give up heat to the fresh air forced by blower 70 into pipe 71, and afterwards gain access to the atmosphere through a discharge pipe 73.

The described means for regulating the output of thermal power plants work in the following manner:

In the state of equilibrium between the produced output and energy taken up by the consumer 14 the quantity of working medium circulating in the closed cycle remains unchanged. The throttling member 9 is then in its fully open or almost fully open position.

If, however, by way of example, the consumption of the consumer 14 should drop, the speed of the turbine 10 increases, so that the centrifugal governor 20 urges rod 21 upwards. This involves such a displacement of the control valve 24 that liquid under pressure from the channel 25 can pass to the upper side of the piston 27 whereby the latter is caused to move downwards. The rod 28 hereby rocks the lever 29 about journal $29^1$ in such a sense that the throttling member 9 is moved in the closing direction against the pressure exerted by spring 30 so that the output produced in the power plant is reduced. Thus, a new state of equilibrium is obtained, the throttle member 9 being now in a different position, whilst the quantity of working medium circulating within the closed cycle is still the same. Such working conditions prevail as long as the changes in load only amount to a certain fraction, for example 10-20% of the output obtained when the circuit current is not throttled, since in such a case the movements of the piston 27, and therefore also of the throttle valve 9, remain so small that the cams 34 and 35 of lever 33 which is operatively connected to the piston 27, do not touch stops 36 and 37 on the spindles of valves 15 and 17 respectively. Said working conditions prevail as long as the retarding device is not brought into action by the control valve 38.

However, as soon as a drop in load occurs which exceeds said fraction, then the auxiliary piston 27 closes still more the throttling member 9 and at the same time it turns lever 33 around journal 40 to such an extent that the cam 34 is urged against stop 36 so that the discharge valve 15 is opened against the action of the spring 41. Working medium is now withdrawn through pipe 43 from the normal cycle described by the working medium until the speed has dropped, owing to a sinking of the output of the turbine 10, to such an extent that a return movement of the auxiliary piston 27 is brought about. The result of the latter is a closing of the valve 15 and a moving of the throttle valve 9 in the opening sense. This valve 9 and piston 27 now assumes new positions of equilibrium amongst those positions which are possible with valves 15 and 17 closed.

A restoring movement of the regulating members is brought about by the pressure of the working medium prevailing in pipe 11, since the pressure in this pipe is transmitted through pipe 46 to the lower side of piston 47. As a reduction in the quantity of working medium circulating within the cycle of the plant also causes a drop in pressure in pipe 11, the spring 48 is able to urge the piston 47 downwards, as soon as such a decrease in pressure occurs. A downward movement of the piston 47 involves, however, an upward movement of the sleeve 51 surrounding the control valve 24, whereby the controlling slots which had been opened owing to a previous upward movement of the control valve 24, due to a drop in load, are again closed.

An increase in the load on the plant involves a drop in speed which in its turn causes movements of the regulating members in senses opposite to those described above.

An increase in output, without the quantity of working medium describing the closed cycle of the plant being changed, is only possible up to the full opening of the throttling member 9. In the position of the auxiliary piston 27 which corresponds to the last mentioned position of said throttling member 9, the lever 33 assumes such a position that its cam 35 just touches the stop 37 on the spindle of the inlet valve 17, so that when a further upward movement of the auxiliary piston 27 takes place as a result of a further increase in load, the valve 17 is opened. Working medium can now flow from the high pressure reservoir 19 into the cycle described by the working medium.

In order to avoid a throttling of the working medium describing the closed circuit during longer intervals of time, a retarding device connected to the throttling member 9 is provided, which permits of the smaller discharge valve 17 being operated with a certain retardation within those limits where the discharge valve 15 permitting withdrawal of working medium from the cycle is not operated. It will be seen that when the throttle member 9 moves into the throttling position, lever 29 is rocked about the fixed fulcrum 29¹ in an anti-clockwise sense, the rod 39 with control valve 38 thereby being moved upwards. Liquid under pressure can now flow from pipe 60 through pipes 62 and 64 into the space below piston 65, whereby the valve 16 is opened as soon as the member 67 hits against sleeve 68. The interval of time within which this latter action takes place can be varied. The withdrawal of working medium from the normal cycle described by the working medium through valve 16 continues until the throttle valve 9 opens again as a result of a drop in the output of the plant. When the full-open position of throttle valve 9 is almost reached the controlling valve 38 cuts off the flow of liquid under pressure through pipe 62 whilst an unthrottled discharge of liquid through pipe 63 can take place. As a consequence the piston 63 is urged immediately downwards by the spring 66 thus allowing spring 69 to close valve 16.

The working medium which has to be supplied to or withdrawn from the cycle of the plant can be conveniently led into or out of the cycle at a point between the compressor and turbine, thus ensuring that the regulating actions are speedily carried out.

The throttling member can, in principle, be arranged at any point of the cycle; it will, however, be found convenient to arrange same near the inlet or outlet of the turbine.

One valve instead of two for controlling the withdrawal of medium from the cycle will prove sufficient if means are provided to ensure that such a single valve can, when the throttling member has been closed to a certain amount, already be opened with a certain retardation in time before the adjustable clearance in a device for operating said valve has been passed through. Such an embodiment is illustrated in Fig. 2 in which all parts corresponding to those shown in Fig. 1 are denoted with the same reference numbers. A valve corresponding to valve 16 of Fig. 1 can be dispensed with in a device of the kind shown in Fig. 2; in place of same a beam 75 is linked to the sleeve 68 at point 68¹, this beam being also linked at point 76 to the piston rod 28¹. However, the lever 33 is not, as in the case of Fig. 1, connected directly to rod 28¹, but is, by means of a rod 77, linked to the left hand end 78 of the beam 75. A spring 69 endeavours to urge the sleeve 68 against the lower section of casing 79.

In the positions of the various parts shown in Fig. 2, the sleeve 68 is kept in its lowermost position by spring 69. If a downward movement of the servomotor piston 27 and rod 28¹ takes place, the beam 75 is rocked about fulcrum 68¹ which for the moment acts as a fixed pivot, whereby lever 33 connected by rod 77 to this beam 75 is turned in a clockwise sense around the fulcrum 40. Hereby the valve 15 allowing a withdrawal of working medium from the cycle of the plant is only operated, in the manner referred to with regard to Fig. 1, after the clearance between cam 34 and stop 36 has been passed through.

In the throttling position of valve 9 (Fig. 1) the piston 65 is, as already described further up, slowly raised, whereby at the end of an adjustable interval of time the member 67 strikes against sleeve 68 pushing the latter upwards.

This involves, in a given position of rod 28¹ and therefore also of fulcrum 76, a downward movement of rod 77 and in conjunction therewith a clockwise movement of lever 33, i. e. an approach of cam 34 to stop 36. The device can conveniently be designed in such a manner that, in the uppermost position of sleeve 68 and in the mid-position of piston 27, the cam 34 practically touches stop 36.

What is claimed is:

1. Method for regulating the output of thermal power plants, in which a gaseous working medium, preferably air, describes a cycle under pressure above atmospheric and comprising means allowing of temporarily varying the weight of the working medium circulating in the cycle and of throttling the flow within the latter, consisting in compensating fluctuations in load which oscillate within the range of loads defined by the load corresponding to the momentary quantity of working medium circulating in the cycle without being throttled and a load which lies a certain fraction below this last mentioned load, by a corresponding throttling of the current circulating in the cycle, the quantity of the circulating working medium hereby remaining unchanged, and in compensating changes in load of greater magnitude lying beyond said range of loads by a temporary supply of working medium to or a withdrawal of such medium from the circuit respectively.

2. Method for regulating the output of thermal power plants, in which a gaseous working medium, preferably air, describes a cycle under pressure above atmospheric and comprising means allowing of temporarily varying the weight of the working medium circulating in the cycle and of throttling the flow within the latter, consisting in compensating fluctuations in load which oscillate within the range of loads defined by the load corresponding to the momentary quantity of working medium circulating in the cycle without being throttled and a load which lies a certain fraction below this last mentioned load by a corresponding throttling of the current circulating in the cycle, the quantity of the circulating working medium hereby remaining unchanged, compensating changes in load of greater magnitude lying beyond said range of loads by a temporary supply of working medium to or a withdrawal of such medium from the circuit respectively, and in limiting the time during which the circulating current is throttled by withdrawing with a retardation in time, whilst maintaining a constant output of the plant, such a quantity of working medium from the cycle as is necessary for changing over from the working condition with throttling to the working condition without throttling but with a reduced density of the working medium.

3. Thermal power plant, in which a gaseous working medium, preferably air, describes a cycle under pressure above atmospheric, comprising a member for throttling the current circulating in the cycle, means for supplying working medium to the cycle on an increase of load occurring, means for withdrawing working medium from the cycle on a falling off of load occurring, and governing means influenced by the fluctuations in the output arising in the plant and controlling the connection between said throttling means and the means for supplying working medium to and for withdrawing such medium from the cycle, said governing means acting upon the means for supplying working medium to the cycle only when the throttling member has been brought into its practically open position and upon the means for withdrawing working medium from the cycle only when the throttling member has been brought into a position corresponding to a load lying a fraction below the load obtained when the cycle current is not throttled.

4. Thermal power plant, in which a gaseous working medium, preferably air, describes a cycle under pressure above atmospheric, comprising a member for throttling the current circulating in the cycle, a valve for controlling a supply of working medium to the cycle on an increase of load occurring, a valve for controlling a withdrawal of working medium from the cycle on a falling off of load occurring, a speed governor influenced by the fluctuations in the output arising in the plant and controlling the position of said throttling member, and a device also influenced by said speed governor and having an adjustable clearance, said device acting on a further increase of load occurring and when its clearance has been passed through and the open position of the throttling member has been reached, upon the valve controlling the supply of working medium to the cycle and when a given position of the throttling member has been reached owing to a further drop in load, upon the valve controlling the withdrawal of working medium from the cycle.

5. Thermal power plant, in which a gaseous working medium, preferably air, describes a cycle under pressure above atmospheric, comprising a member for throttling the current circulating in the cycle, a valve for controlling a supply of working medium to the cycle on an increase of load occurring, a valve for controlling a withdrawal of working medium from the cycle on a falling off of load occurring, a speed governor influenced by the fluctuations in the output arising in the plant and controlling the position of said throttling member, a device also influenced by said speed governor and having an adjustable clearance, said device acting on a further increase of load occurring and when its clearance has been passed through and the open position of the throttling member has been reached, upon the valve controlling the supply of working medium to the cycle and when a given position of the throttling member has been reached owing to a further drop in load, upon the valve controlling the withdrawal of working medium from the cycle, and means in connection with said valve controlling a withdrawal of working medium from the cycle allowing of opening this valve with a retardation in time before the adjustable clearance in said device for operating this valve has, on the throttling member having been closed to a given extent, been passed through.

6. Thermal power plant, in which a gaseous working medium, preferably air describes a cycle under pressure above atmospheric, comprising a member for throttling the current circulating in the cycle, a valve for controlling a supply of working medium to the cycle on an increase of load occurring, a valve for controlling a withdrawal of working medium from the cycle on a falling off of load occurring, a speed governor influenced by the fluctuations in the output arising in the plant and controlling the position of said throttling member, a device also influenced by said speed governor and having an adjustable clearance, said device acting on a further increase of load occurring and when its clearance has been passed through and the open position of the throtttling member has been reached, upon the valve controlling the supply of working medium to the cycle and when a given position of the throttling member has been reached owing to a further drop in load, upon the valve controlling the withdrawal of working medium from the cycle, and a second valve controlling a withdrawal of working medium from the cycle and also influenced by the speed governor, said second valve being, as soon as the throttling member has been moved into the throttling position, only opened after the expiration of an adjustable interval of time, whereas said second valve, on the throttling member having been brought back into its practically open position, is immediately closed.

7. Thermal power plant, in which a gaseous working medium, preferably air, describes a cycle under pressure above atmospheric, comprising an external source of heat in which heat is supplied to the working medium, at least a turbine in which the working medium thus heated up is allowed to expand whilst the turbine delivers power externally, a turbo-compressor driven by said turbine for compressing the expanded medium again to a higher pressure, governing means influenced by the fluctuations in the output arising in the plant, means for supplying working medium to the cycle on a momentary increase of load occurring, means for withdrawing working medium from the cycle on a momentary falling off of load occurring, means influenced by said governing means for controlling the connection between the closed cycle and said means for supplying working medium to and said means for withdrawing such medium from the cycle, and a throttling member arraged in the path of the working medium describing the closed cycle and also influenced by said governing means, the latter acting upon the means for supplying working medium to the cycle not before the throttling member has been brought into its practically open position and upon the means for withdrawing working medium from the cycle not before the throttling member has been brought into a position corresponding to a load lying a fraction below the load obtained when the cycle current is not throttled.

CURT KELLER.